US011978361B2

(12) United States Patent
Marich

(10) Patent No.: US 11,978,361 B2
(45) Date of Patent: May 7, 2024

(54) POP-UP DISPLAY

(71) Applicant: Menasha Corporation, Neenah, WI (US)

(72) Inventor: Benjamin M. Marich, York, PA (US)

(73) Assignee: Menasha Corporation, Neenah, WI (US)

( * ) Notice: Subject to any disclaimer, the term of this patent is extended or adjusted under 35 U.S.C. 154(b) by 0 days.

(21) Appl. No.: 17/877,006

(22) Filed: Jul. 29, 2022

(65) Prior Publication Data

US 2024/0038099 A1 Feb. 1, 2024

(51) Int. Cl.
*G09F 1/06* (2006.01)

(52) U.S. Cl.
CPC .................................... *G09F 1/065* (2013.01)

(58) Field of Classification Search
CPC .. G09F 1/065; G09F 15/0062; G09F 15/0025; G09F 2015/0093
See application file for complete search history.

(56) References Cited

U.S. PATENT DOCUMENTS

| | | | | |
|---|---|---|---|---|
| 3,301,386 | A * | 1/1967 | Carter | F41B 5/06 224/916 |
| 6,347,772 | B1 * | 2/2002 | L'Hotel | G09F 1/065 206/45.24 |
| 2011/0088300 | A1 * | 4/2011 | Martin Presa | G09F 1/065 40/606.12 |
| 2017/0004746 | A1 * | 1/2017 | Debarros | G09F 1/065 |
| 2018/0075788 | A1 * | 3/2018 | Warmus | G09F 1/065 |
| 2018/0130382 | A1 * | 5/2018 | Hinch | G09F 1/065 |
| 2018/0211571 | A1 * | 7/2018 | Enriquez | G09F 1/065 |
| 2021/0233432 | A1 * | 7/2021 | Enriquez | G09F 1/10 |

* cited by examiner

*Primary Examiner* — David R Dunn
*Assistant Examiner* — Christopher E Veraa
(74) *Attorney, Agent, or Firm* — UB Greensfelder LLP; Richard C. Himelhoch

(57) ABSTRACT

A pop-up display having a first arcuate display panel with an internal side, an external side, a first side edge and a second side edge and a second arcuate display panel with an internal side, an external side, a first side edge abutting the first side edge of the first arcuate display panel and a second side edge abutting the second side edge of the first arcuate display panel. A first insert is connected on a first side to the internal side of the first arcuate display panel and connected on a second side to the internal side of the second arcuate display. The first insert is configured to provide an outward curve to the first arcuate display panel and the second arcuate display panel.

17 Claims, 13 Drawing Sheets

POP-UP DISPLAY

CROSS-REFERENCE TO RELATED APPLICATIONS

None.

FEDERALLY SPONSORED RESEARCH OR DEVELOPMENT

N/A

FIELD OF THE INVENTION

The present invention is generally directed toward a pop-up display that matches a cross-sectional shape of an insert without requiring rubber bands, and more particularly to a pop-up display that in one instance includes curved outer surfaces when set up but that can be shipped flat.

DESCRIPTION OF THE PRIOR ART

A number of displays feature panels having curved outer surfaces. These displays are usually difficult to construct and include complicated structures to maintain the shape of the panels. One such product uses rubber bands to automatically form the display when removed from a shipper. The rubber bands pull the sides of the display inward toward an internal insert, creating an elliptical cross-sectional shape of the display.

Another product uses a flat insert that is taped to the inside of the front panel of the display. The insert is pulled up and a tooth clicks into a slot in the back panel of the display. This shapes the display, but can easily fall out of place if the display is moved.

The present invention provides a pop-up display that does not require rubber bands or complex structures to maintain its shape.

SUMMARY OF THE INVENTION

The present invention provides a pop-up display that can be shipped flat and quickly set-up on site. The display does not require any rubber bands or complex structures that require time to set up or which can break or easily fall apart. In one aspect of the invention, the display can be formed with an insert to create an elliptical cross-sectional shape with the display panels having curved outer surfaces. In other aspects of the invention, the display can include inserts that form other cross-sectional shapes, such as circular, square, rectangular or triangular with panel walls having flat outer surfaces that conform to the cross-sectional shape required by the insert.

In accordance with one aspect of the invention, a display having curved outer surfaces is provided. The display comprises a first arcuate display panel having an internal side, an external side, a first side edge and a second side edge, and a second arcuate display panel having an internal side, an external side. The second arcuate display panel includes a first side edge abutting the first side edge of the first arcuate display panel and a second side edge abutting the second side edge of the first arcuate display panel. A first insert is connected on a first side to the internal side of the first arcuate display panel and connected on a second side to the internal side of the second arcuate display panel. The first insert is configured to provide an outward curve to the first arcuate display panel and the second arcuate display panel. The first insert can be positioned at a first end of the display.

The display also includes a second insert connected on a first side to the internal side of the first arcuate display panel and connected on a second side to the internal side of the second arcuate display panel. The second insert is spaced from the first insert and configured to provide an outward curve to the first arcuate display panel and the second arcuate display panel. The second insert can be positioned at a second end of the display.

The first insert includes a first fold line to enable the insert to move from a collapsed position to an expanded position. Similarly, the second insert includes a first fold line to enable the insert to move from a collapsed position to an expanded position. Additionally, the first and second inserts include a finger opening to enable a user to move the insert from the collapsed position to the expanded position.

Each of the inserts includes a first foldable tab for maintaining the insert in the expanded position. Each insert also includes a first slot for receiving a portion of the first foldable tab. Additionally, each insert can include a second foldable tab for maintain the first insert in the expanded position, and a second slot for receiving a portion of the second foldable tab.

The first insert and second insert can be connected to the first arcuate display panel by a first adhesive strip. Similarly, each insert can be connected to the second arcuate display panel by a second adhesive strip.

The first arcuate display panel and the second arcuate display panel can be formed from a single blank of material. Each panel is separated by a fold line defining the first edge of the first arcuate display panel and the first edge of the second arcuate display panel. A first glue strip can extend from the second edge of the first arcuate display panel for connecting the second edge of the first arcuate display panel to the second edge of the second arcuate display panel.

The display can also include a base for supporting the display in an upright position. The base can be a disk of material having foldable projections.

The display panels can include one or more horizontal fold lines. This enables the display to be folded for shipment.

The display can be formed from paperboard. Alternatively, the display can be formed from plastic or a corrugated paper or plastic material.

In accordance with another aspect of the invention, a pop-up display is provided. The pop-up display comprises a first generally rectangular display panel having a first side edge, a second side edge and an arcuate outer surface, and a second generally rectangular display panel having a first side edge connected to the first side edge of the first display panel, a second side edge connected to the second side edge of the first display panel, and an arcuate outer surface. A first foldable insert is attached to an inner surface of the first display panel and to an inner surface of the second display panel where the first foldable insert is movable from a folded collapsed position to an unfolded open position and a second foldable insert is attached to the inner surface of the first display panel and to the inner surface of the second display panel where the second foldable insert movable from a folded collapsed position to an unfolded open position.

The first display panel and second display panel can be part of a single blank of material and are separated by a fold line. A base can be provided to support the display in an upright position.

In accordance with another aspect of the invention, a pop-up display with flat panels is provided. The display comprises a first generally rectangular panel having a flat, planar outer surface, a second generally rectangular panel having a flat, planar outer surface and a third generally rectangular panel having a flat, planar outer surface. A first foldable insert is attached to an inner surface of the first panel and to an inner surface of the third panel at a first end of the display. In this instance, the display is formed to have a triangular cross-sectional shape.

In accordance with yet another aspect of the invention, the display having three panels can also comprise a fourth generally rectangular panel having a flat, planar outer surface. In this instance, the display is formed to have a triangular cross-sectional shape. In each instance, the displays can include a second foldable insert attached at a second end of the display. Moreover, no rubber bands or other structures are needed to maintain the shape of the displays. One or more panels in the displays can include fold lines to enable the display to lay flat when the inserts are not expanded.

Other features and advantages of the invention will be apparent from the following specification taken in conjunction with the following Figures.

BRIEF DESCRIPTION OF THE DRAWINGS

To understand the present invention, it will now be described by way of example, with reference to the accompanying drawings in which.

DETAILED DESCRIPTION

Figure 1:
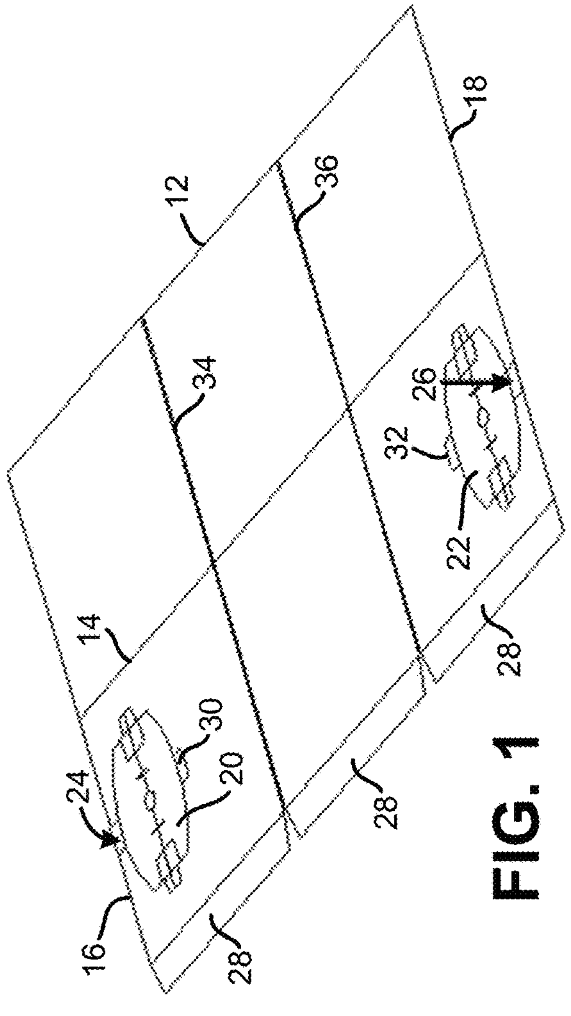
FIG. 1 is a view of an internal side of an unassembled display in accordance with the present invention having a first unfolded internal insert at a first end and a second unfolded internal insert at a second end.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 16:
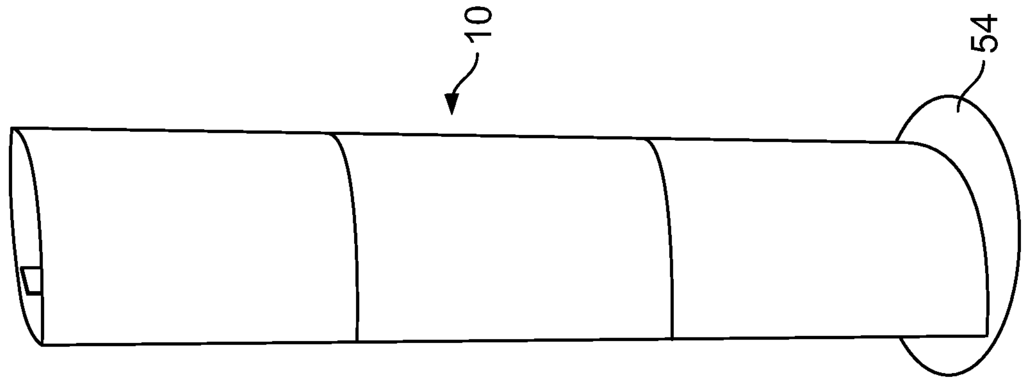
FIG. 16 is a perspective view of the display of FIG. 15 supported on the stand.
Figure 15:
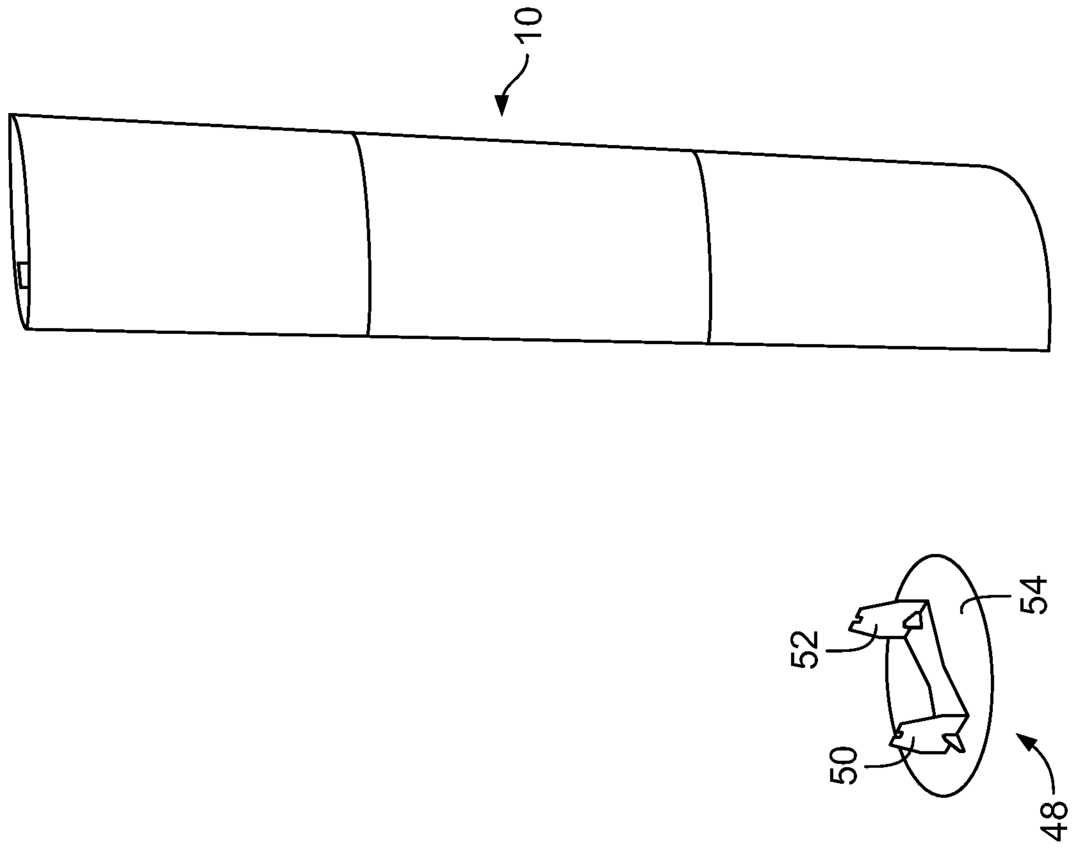
FIG. 15 is a perspective view of the display of FIG. 14 next to a stand.

The present invention is directed to a pop-up display 10 that can be shipped folded and flat (see e.g., FIG. 8), and then be expanded on site (see e.g., FIG. 16). In the aspect of the invention shown of FIGS. 1-16, the display 10 uniquely provides panels with arcuate or curved outer surfaces without the need for rubber bands, clips or other similar structures for maintaining its shape.

The display 10 is formed from a single, generally rectangular blank or sheet of material 12, as shown in FIG. 1, having a fold line 14 that divides the sheet into a first panel 16 and a second panel 18. A first internal, foldable insert 20 is positioned proximate a first end of the first panel 16, and a second foldable insert 22 is positioned proximate a second end of the first panel 16. A plurality of glue strips 28 extend outward from one side of the first panel 16.

The first insert 20 is connected to the first panel 16 by a first piece of tape 24, and the second insert 22 is connected to the first panel by a first piece of tape 26. Each insert 20, 22 includes a second piece of tape 30, 32 for connecting the insert 20, 22 to the second panel 18 as set forth below. The first insert 20 can also include foldable tabs that have adhesive or glue to connect the insert to the panels.

Figure 2:
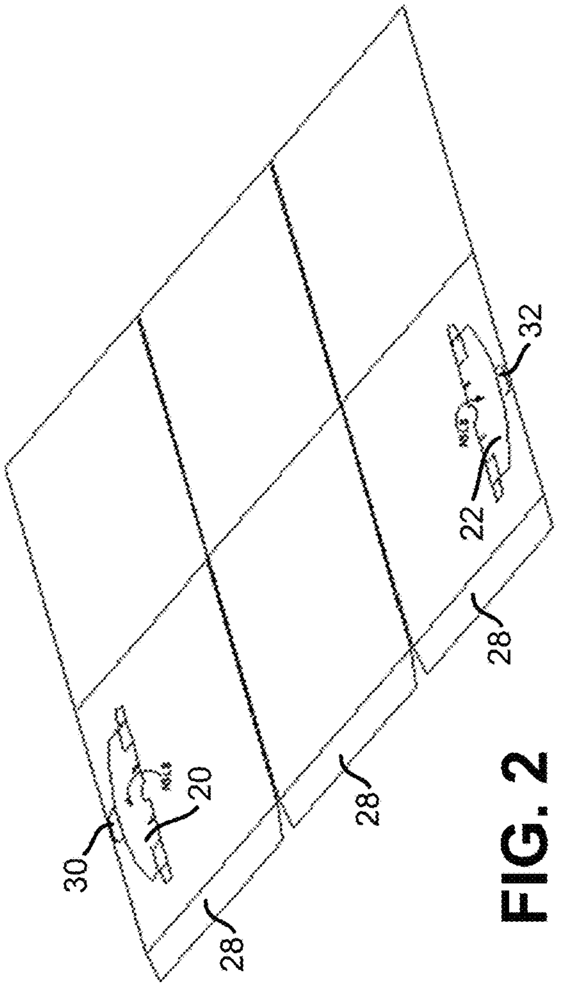
FIG. 2 is a view of the display of FIG. 1 with the first and second inserts folded.
Figure 3:
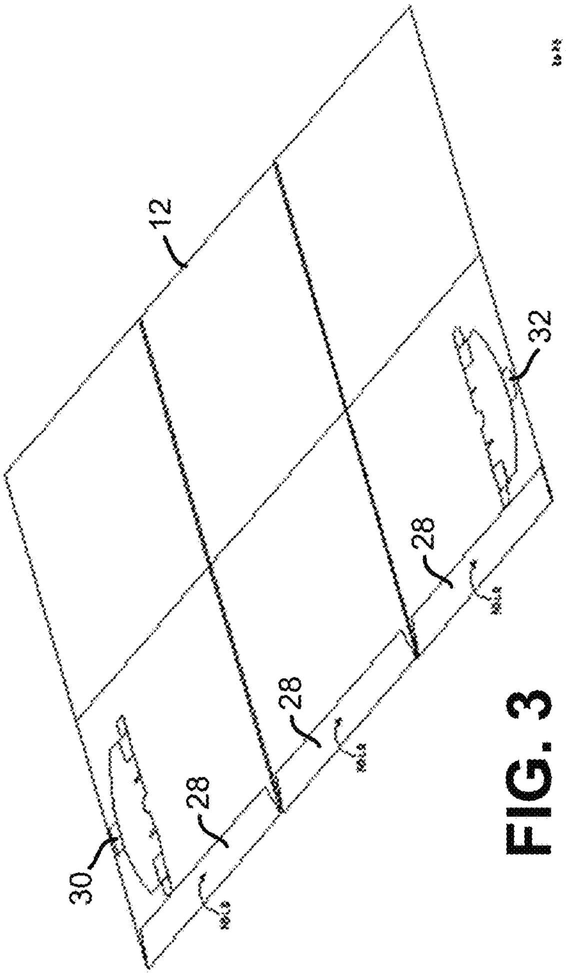
FIG. 3 is a view of the display of FIGS. 1 and 2 with glue tabs along one side of the display folded over.
Figure 4:
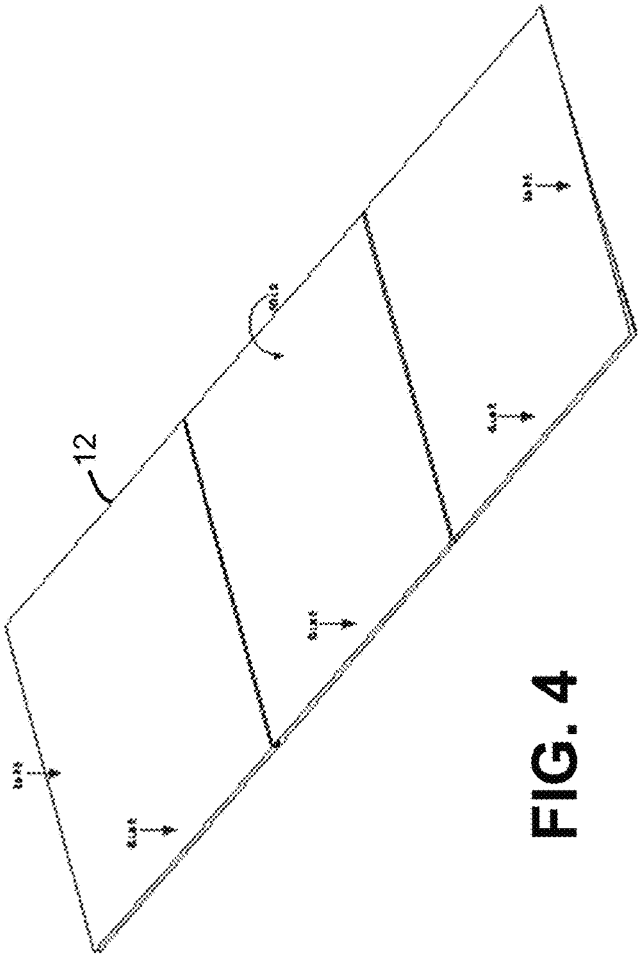
FIG. 4 is a view of the display of FIGS. 1-3 with a first half of the display folded over a second half of the display.

To further form the display 10, each insert 20, 22 includes a central fold line so that the insert can be folded over as shown in FIG. 2. The glue strips 28 on the side of the sheet 12 are then folded as shown in FIG. 3 and the sheet 12 is folded over as shown in FIG. 4. When the sheet 12 is folded over fold line 14 the second piece of tape 30, 32 of the inserts 20, 22 is adhered to the (now) interior surface of the second panel 18 and the glue strips adhere the sides of the two panels 16, 18.

Folding the panels 16, 18 brings an outer edge of the second panel 18 into an abutting relationship with the outer edge of the first panel 16. The inner edges of both panels 16, 18, abut at the fold line 14. While the display 10 is shown as being formed from a single blank of material 12, two separate panels can be used. In this instance, additional glue strips can be provided on one of the panels to secure the second side of the panels to each other.

Figure 8:
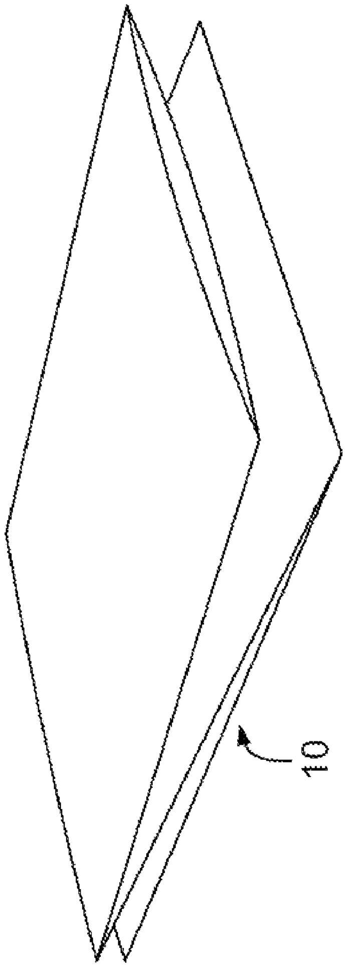
FIG. 8 is a perspective view of a folded display in accordance with an aspect of the present invention.

As illustrated in FIG. 4, the display 10 is initially in a flat configuration and can be shipped more efficiently in this state. Additionally, the display 10 can include one or more cross-fold lines 34, 36 which enable the display 10 to be further folded as shown in FIG. 8.

Figure 5:
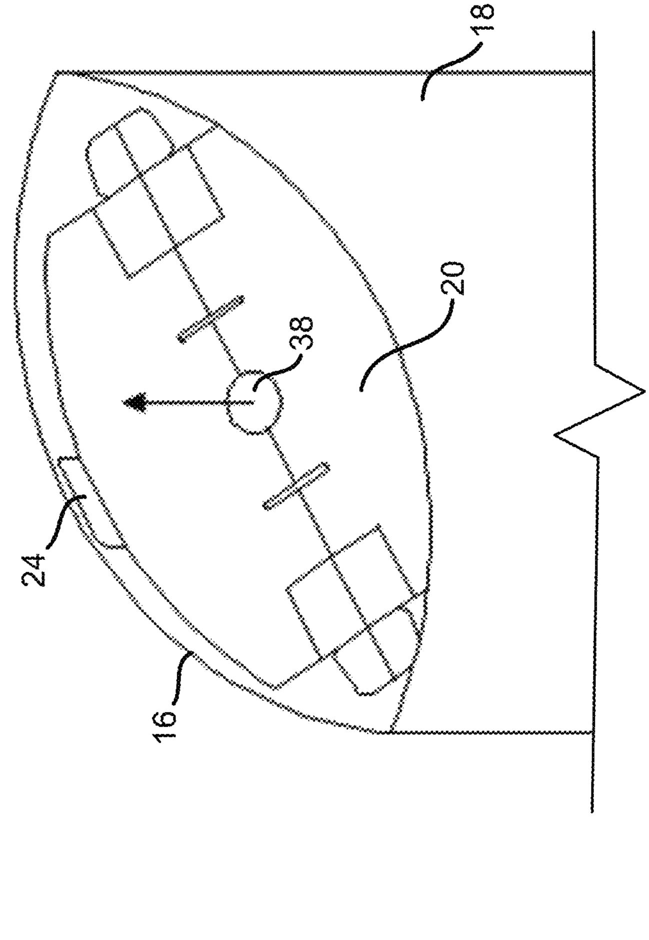
FIG. 5 is a perspective view of one end of the display with the first insert unfolded to provide an elliptical cross-sectional shape.
Figure 6:
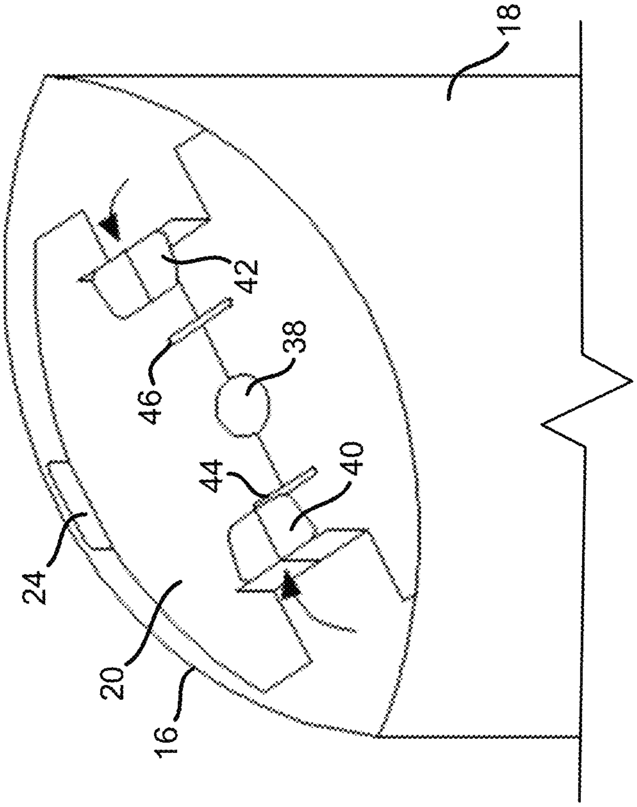
FIG. 6 is a perspective view of the display of FIG. 5 with locking tabs on either side of the first insert partially deployed.

The first insert 20 is shown unfolded and in an expanded position in FIGS. 5-6. In this position, the insert 20 forces each of the first and second panels 16, 18 to have an arcuate (i.e., curved) outer surface and for the display 10 to have a generally elliptical cross-sectional shape. The curvature of the panels 16, 18 follows the curvature of the outer edges of each half of the insert 20.

The insert 20 includes a central opening or aperture 38. This can be used as a finger hole to pull the insert 20 into the expanded position.

Figure 7:
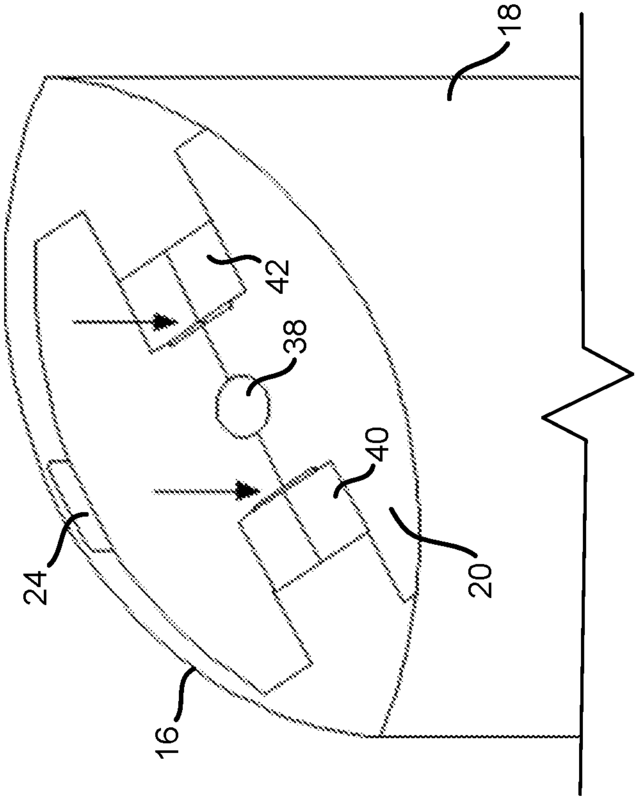
FIG. 7 is a perspective view of the display of FIG. 6 with the locking tabs on either side of the first insert fully deployed.

As illustrated in FIGS. 6 and 7, the insert 20 also includes a first locking tab 40 and a second locking tab 42 on either end of the insert 20. The locking tabs 40, 42 can be folded over and interact with slots 44, 46 to keep the insert 20 in the expanded position.

Figure 10:
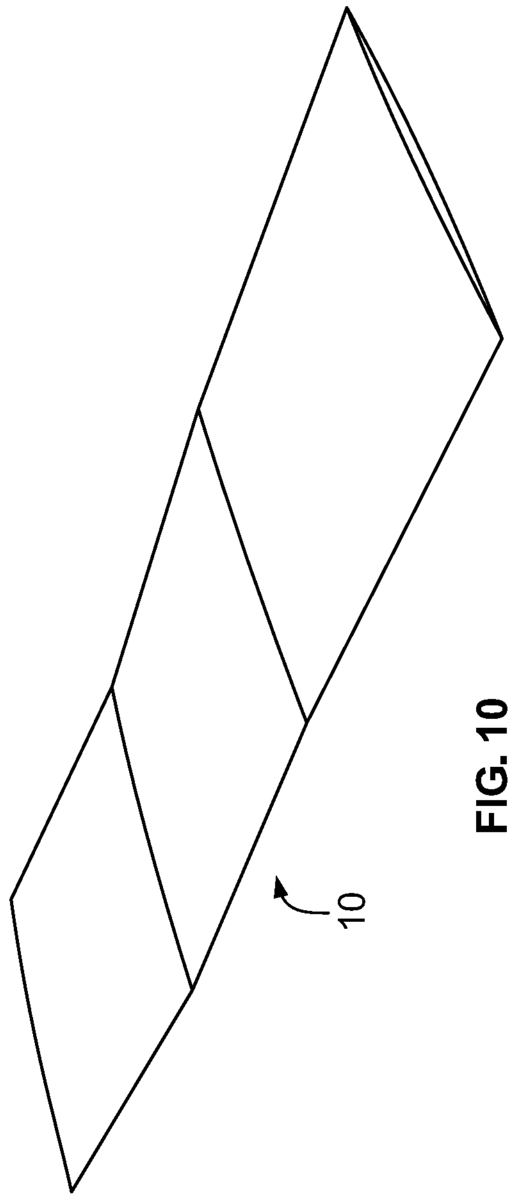
FIG. 10 is a perspective view of the display of FIG. 8 fully unfolded.
Figure 9:
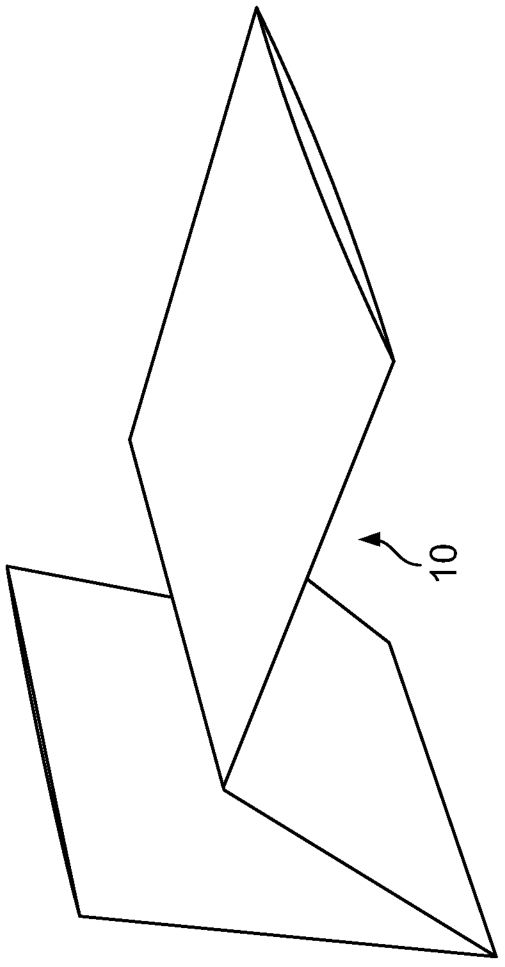
FIG. 9 is a perspective view of the display of FIG. 8 partially unfolded.
Figure 11:
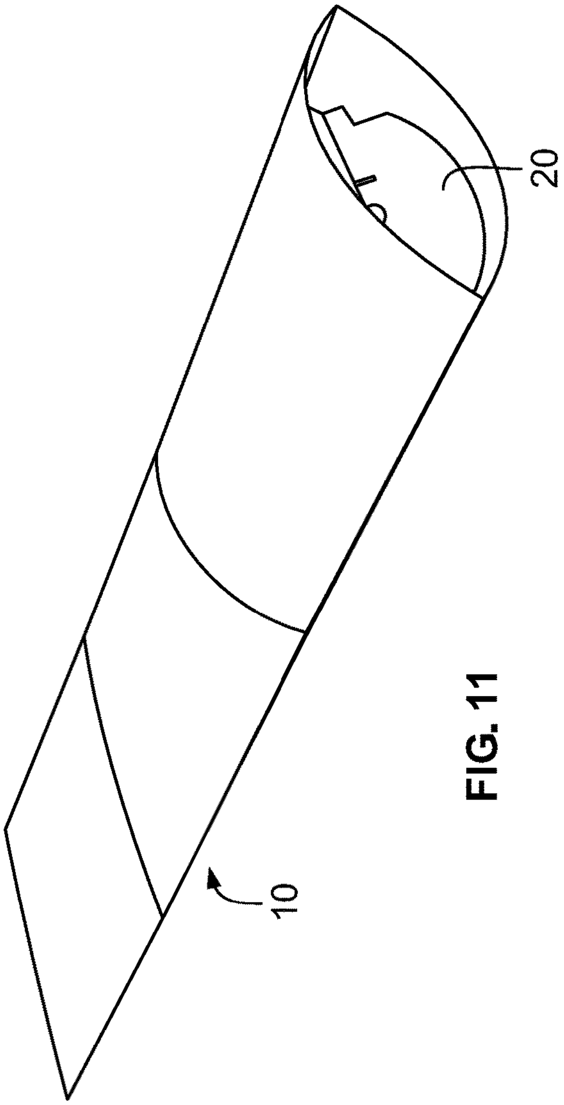
FIG. 11 is a perspective view of the display of FIG. 10 with a first insert partially expanded.
Figure 12:
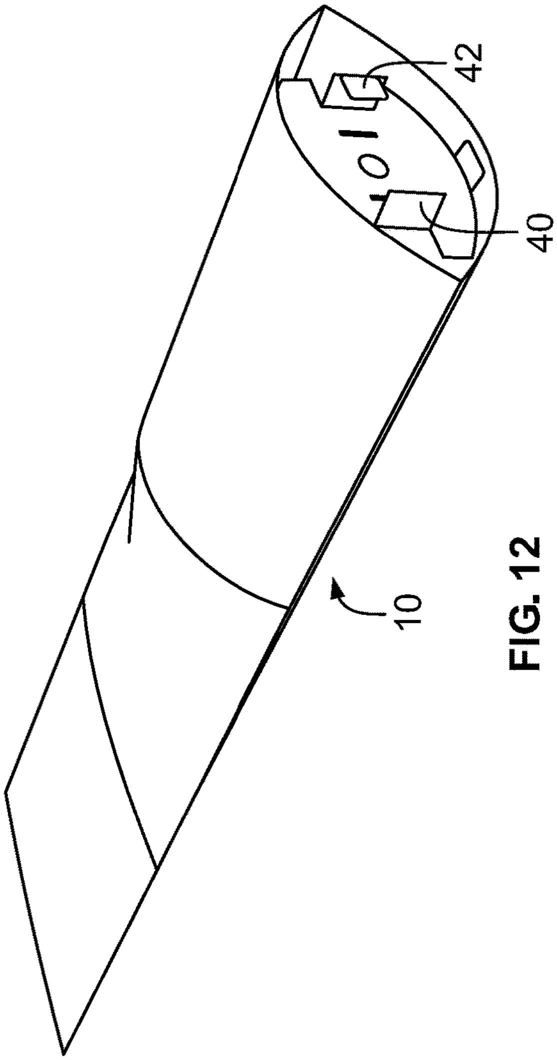
FIG. 12 is a perspective view of the display of FIG. 11 with the first insert fully expanded and locking tabs partially deployed.
Figure 13:
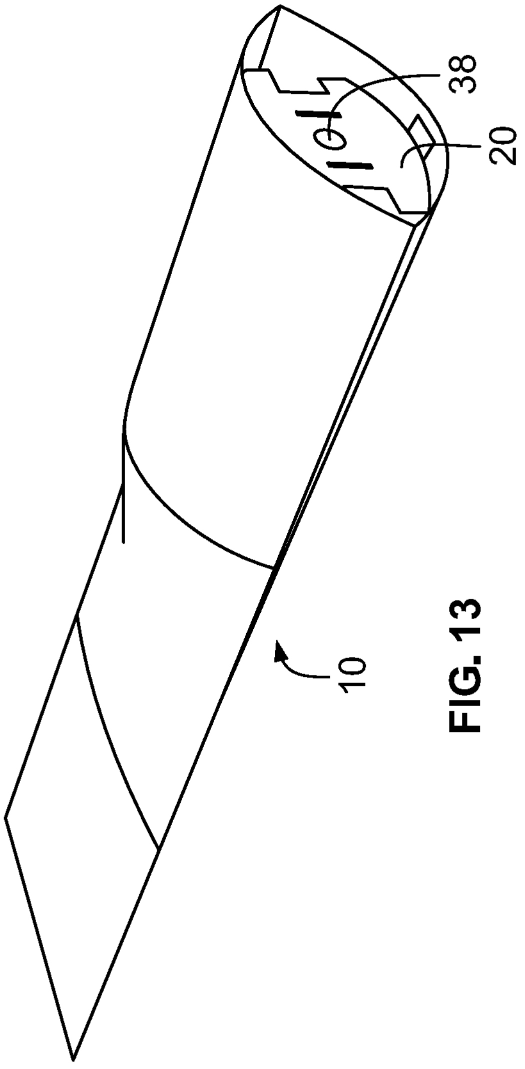
FIG. 13 is a perspective view of the display of FIG. 12 with the locking tabs fully deployed.
Figure 14:
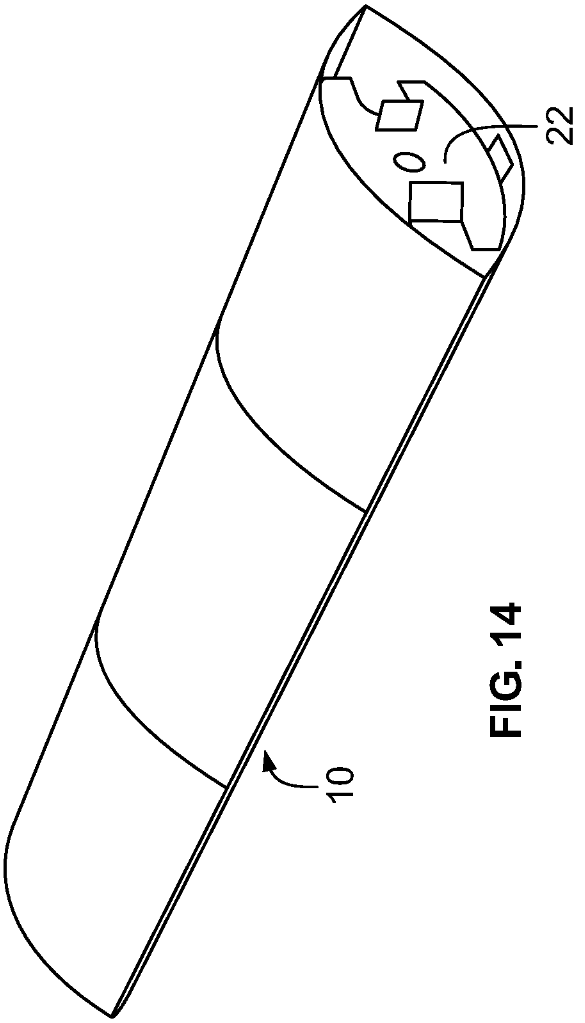
FIG. 14 is a perspective view of the display of FIG. 13 with a second insert fully expanded and the locking tabs partially deployed.

FIG. 8 shows the display 10 in a folded configuration which can be used for shipping it to a retail location. To set up, the display 10 is first unfolded as illustrated in FIGS. 9 and 10. The first insert 20 is then pulled to an expanded position and the tabs 40, 42 are folded over as shown in FIGS. 11-13. This is repeated with the second insert 22 (see FIG. 14) to place both inserts 20, 22 into an expanded position.

The display 10 can also include a stand 48. The stand 48 can include two upwardly extending projections 50, 52. The projections can be foldable panels connected to a base portion 54 of the stand 48. The stand 48 is shown with the projections 50, 52 next to the display 10 in FIG. 15. FIG. 16 shows the display 10 supported on the stand 48.

The display 10 can include any type of design or indicia desired on the outer surfaces of the two panels 16, 18. Moreover, it can be easily shipped and assembled on site without the need for rubber bands, clips or other structures.

Figure 18:
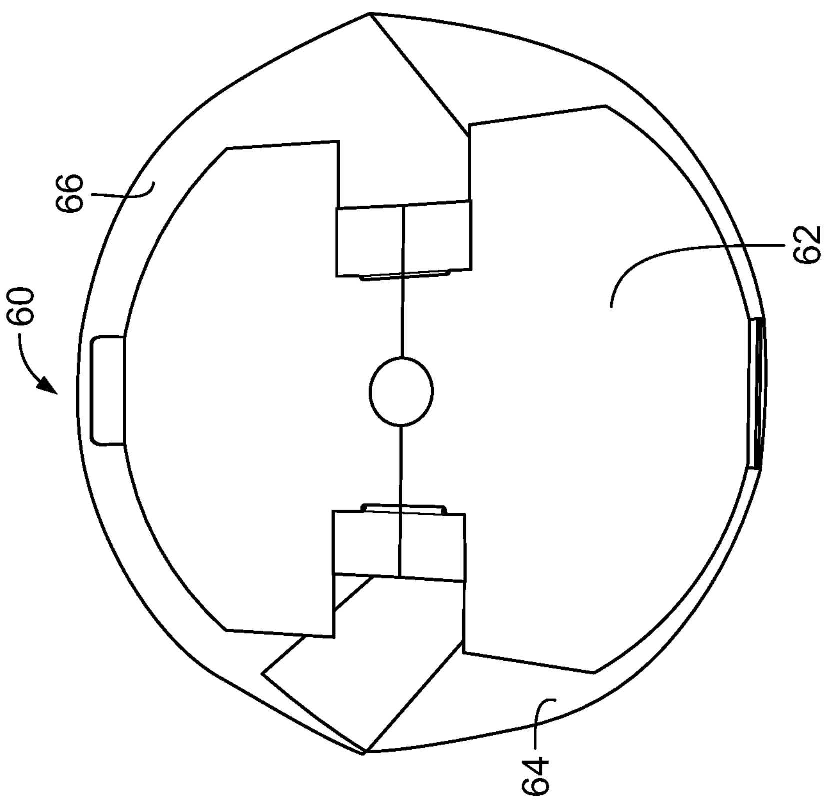
FIG. 18 is an end view of the display of FIG. 17.
Figure 17:
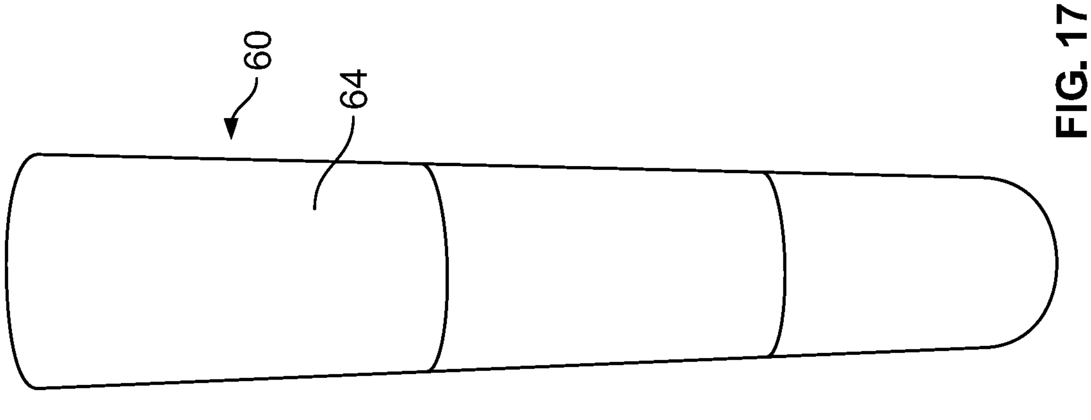
FIG. 17 is a perspective view of a display in accordance with another aspect of the present invention having an insert for forming a circular cross-sectional shape of the display.

In accordance with another aspect of the invention, FIGS. 17 and 18 show a display having an insert 62 configured to form a circular cross-sectional shape. Similar to the elliptical cross-sectional shape of the display 10 of FIGS. 1-16, the display 60 of FIGS. 17 and 18 includes two panels 64, 66, each having an arcuate outer surface.

Figure 20:
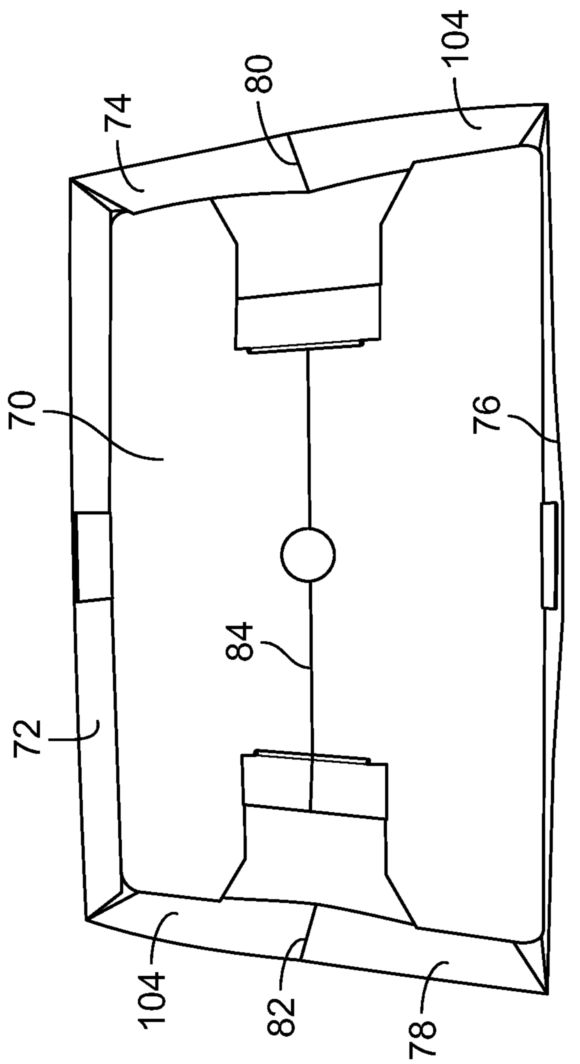
FIG. 20 is an end view of the display of FIG. 19.
Figure 19:
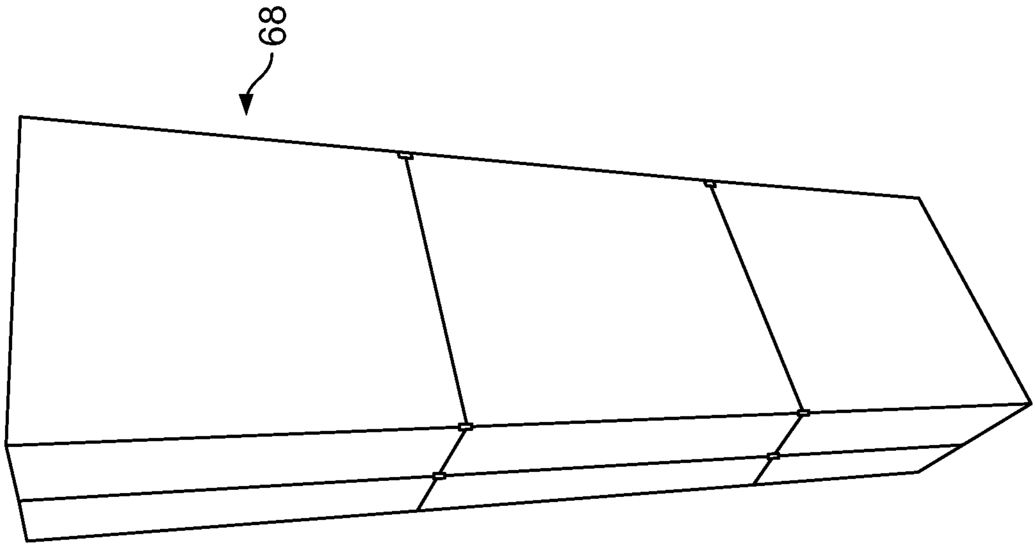
FIG. 19 is a perspective view of a display in accordance with another aspect of the invention having an insert for forming a rectangular cross-sectional shape of the display.

FIGS. 19 and 20 show a display 68 having an insert 70 configured to form a rectangular cross-sectional shape. The display 68 includes four outer panels 72, 74, 76, 78—one for each side of the rectangle. Unlike the displays 10 and 60, the panels 72, 74, 76, 78 are flat or planar as opposed to having an arcuate or curved shape. Two opposing panels 74, 78 have fold lines 80, 82 that correspond with a fold line 84 in the insert 70. This enables the display 68 to fold flat.

Figure 22:
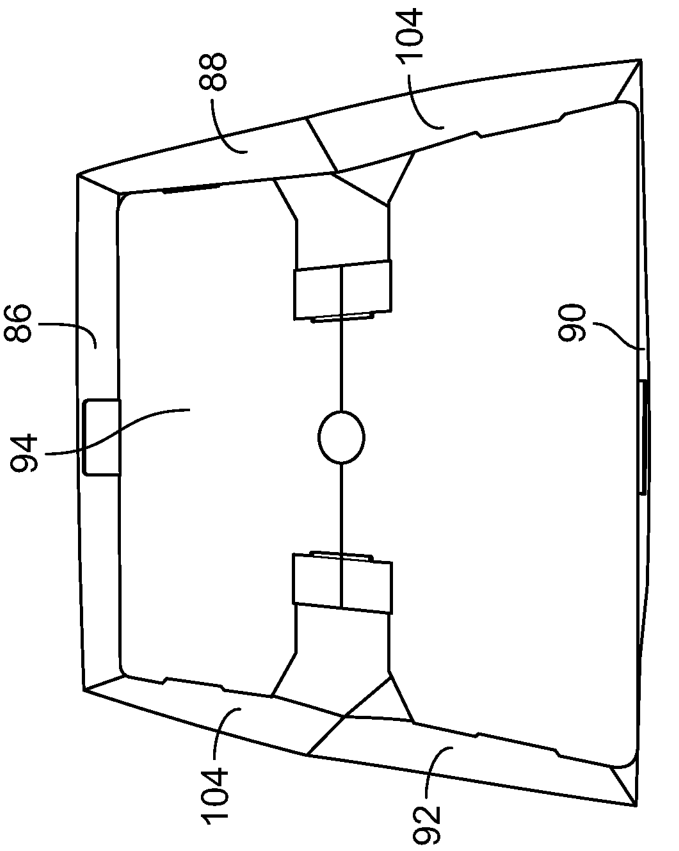
FIG. 22 is an end view of the display of FIG. 21.
Figure 21:
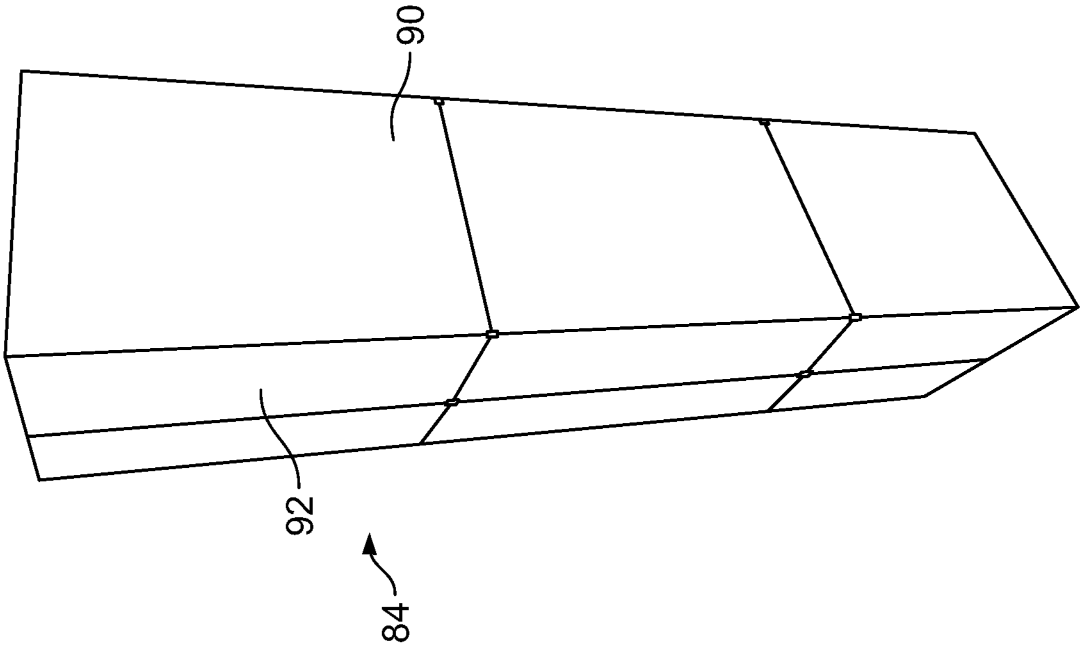
FIG. 21 is a perspective view of a display in accordance with another aspect of the invention having an insert for forming a square cross-sectional shape of the display

FIGS. 21 and 22 show another display 84 having a rectangular cross-sectional shape in the form of a square. The display 84 includes four outer panels 86, 88, 90, 92 having the same width positioned around an insert 94.

Figure 24:
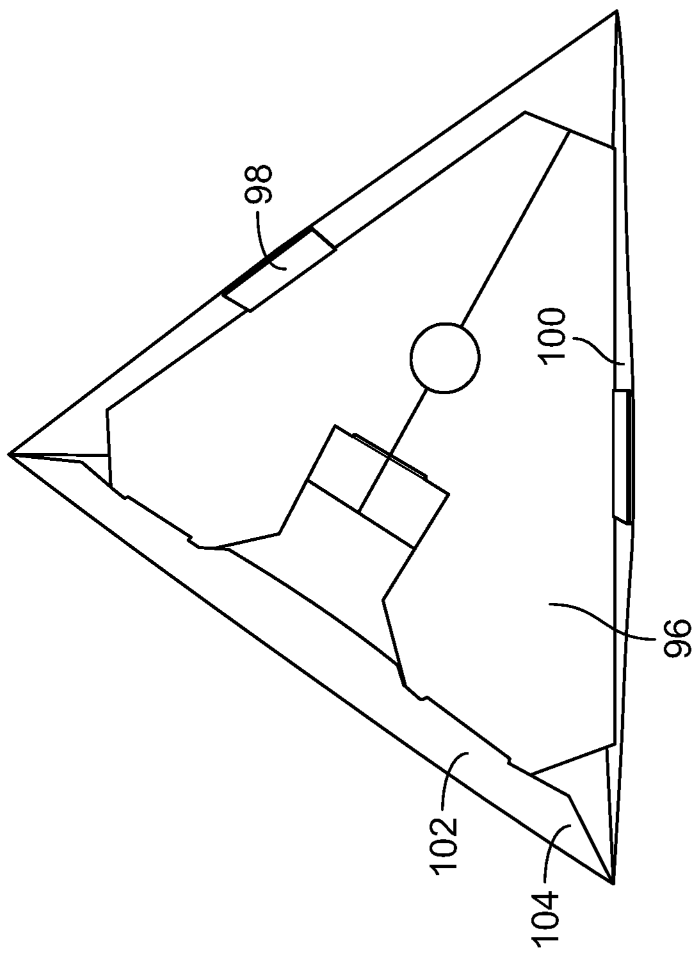
Figure 23:
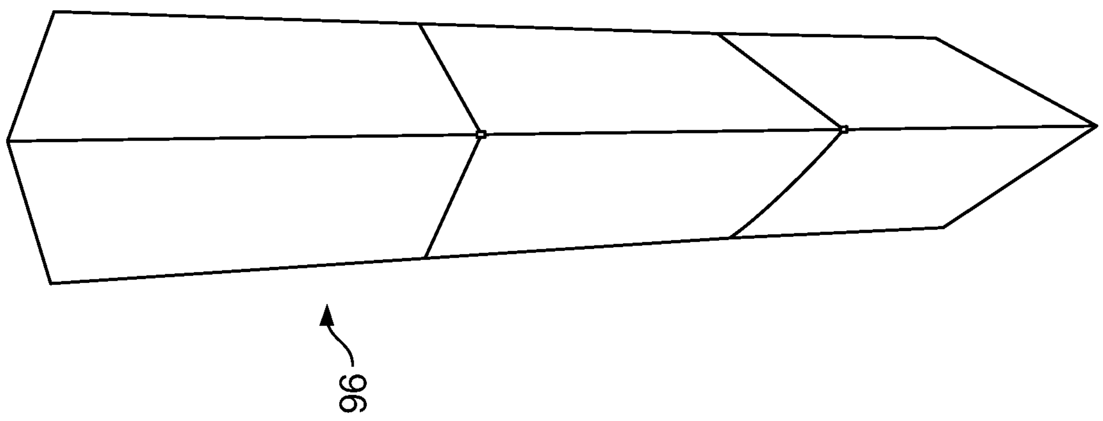
FIG. 23 is a perspective view of a display in accordance with another aspect of the invention having an insert for forming a triangular cross-sectional shape of the display; and, FIG. 24 is an end view of the display of FIG. 23.

FIGS. 23 and 24 show another display 96 having a triangular cross-sectional shape. The display 94 includes an insert 96 and three outer display panels 98, 100, 102. One of the panels can include a fold line to correspond with a fold line in the insert 96.

With respect to the displays 68, 84 and 96 shown in FIGS. 19-24, one or more of the outer panels can include flaps 104 that can be folded toward the interior of the display to contact the top of the inserts. Moreover, unlike the displays 10, 60, which force the outer panels to have an arcuate shape, each of these displays 68, 84, 96 include flat, planar panels.

All of the panels can be separated by fold lines from a single blank of material in manner similar to the aspect of the invention in FIGS. 1-16. Additionally, each of the panels can have cross-wise fold lines to enable the display to be folded up when not in use.

While the inserts and panels of the displays of FIGS. 17-24 have various shapes, they have similar or identical features in common with the display of FIGS. 1-16. For example, they all include an opening or aperture to enable a user to expand the insert, locking tabs/slots etc.

Additionally, the displays can be formed in other traditional shapes (e.g., having a hexagonal or trapezoidal cross-section, etc.), or have a combination of flat panels and panels having an arcuate shape.

The components of the displays shown are formed from paperboard. However, other similar or suitable materials, such as plastic films or corrugated paper or plastic, can also be used.

Many modifications and variations of the present invention are possible in light of the above teachings. It is, therefore, to be understood within the scope of the appended claims the invention may be protected otherwise than as specifically described.

I claim:

1. A display comprising:

a first arcuate display panel having an internal side, an external side, a first side edge and a second side edge;

a second arcuate display panel having an internal side, an external side, a first side edge abutting the first side edge of the first arcuate display panel and a second side edge abutting the second side edge of the first arcuate display panel; and a first insert connected on a first side to the internal side of the first arcuate display panel and connected on a second side to the internal side of the second arcuate display panel, the first insert configured to provide an outward curve to the first arcuate display panel and the second arcuate display panel; wherein the first insert includes a first fold line to enable the insert to move from a collapsed position to an expanded position and a first slot that extends perpendicular to and crosses the fold line, wherein the first insert includes a first foldable tab configured to be inserted in the first slot for maintaining the first insert in the expanded position.

2. The display of claim 1 wherein the first insert is positioned at a first end of the display.

3. The display of claim 2 further comprising:

a second insert connected on a first side to the internal side of the first arcuate display panel and connected on a second side to the internal side of the second arcuate display panel, the second insert spaced from the first insert and configured to provide an outward curve to the first arcuate display panel and the second arcuate display panel.

4. The display of claim 3 wherein the second insert is positioned at a second end of the display.

5. The display of claim 1 wherein the first insert includes a finger opening to enable a user to move the insert from the collapsed position to the expanded position.

6. The display of claim 1 wherein the first insert includes a second slot that extends perpendicular to and crosses the fold line and a second foldable tab configured to be inserted in the second slot for maintaining the first insert in the expanded position.

7. The display of claim 1 wherein the first insert is connected to the first arcuate display panel by a first adhesive strip.

8. The display of claim 7 wherein the first insert is connected to the second arcuate display panel by a second adhesive strip.

9. The display of claim 1 wherein the first arcuate display panel and the second arcuate display panel are formed from a single blank of material and are separated by a fold line defining the first edge of the first arcuate display panel and the first edge of the second arcuate display panel.

10. The display of claim 9 further comprising a first glue strip extending from the second edge of the first arcuate display panel for connecting the second edge of the first arcuate display panel to the second edge of the second arcuate display panel.

11. The display of claim 1 further comprising a base for supporting the display in an upright position.

12. The display of claim 1 wherein the first arcuate display panel includes a first horizontal fold line and a second horizontal fold line spaced from the first horizontal fold line.

13. The display of claim 1 wherein the first arcuate display panel, the second arcuate display panel and the first insert are formed from paper.

14. The display of claim 1 wherein the first arcuate display panel, the second arcuate display panel and the first insert are formed from plastic.

15. A pop-up display comprising:

a first generally rectangular display panel having a first side edge, a second side edge and an arcuate outer surface;

a second generally rectangular display panel having a first side edge connected to the first side edge of the first display panel, a second side edge connected to the second side edge of the first display panel, and an arcuate outer surface;

a first foldable insert attached to an inner surface of the first display panel and to an inner surface of the second display panel, the first foldable insert movable from a folded collapsed position to an unfolded open position; and, a second foldable insert attached to the inner surface of the first display panel and to the inner surface of the second display panel, the second foldable insert movable from a folded collapsed position to an unfolded open position; wherein the first insert includes a first fold line to enable the insert to move from a collapsed position to an expanded position and a first slot that extends perpendicular to and crosses the fold line, wherein the first insert includes a first foldable tab configured to be inserted in the first slot for maintaining the first insert in the expanded position.

16. The pop-up display of claim 15 wherein the first display panel and second display panel are part of a single blank of material and are separated by a fold line.

17. The pop-up display of claim 15 including a base to support the display in an upright position.

* * * * *